(12) United States Patent
Inata

(10) Patent No.: US 11,421,744 B2
(45) Date of Patent: Aug. 23, 2022

(54) DAMPER DEVICE

(71) Applicant: Suzuki Motor Corporation, Hamamatsu (JP)

(72) Inventor: Hiroki Inata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 298 days.

(21) Appl. No.: 16/600,033

(22) Filed: Oct. 11, 2019

(65) Prior Publication Data
US 2020/0124111 A1 Apr. 23, 2020

(30) Foreign Application Priority Data
Oct. 17, 2018 (JP) .............................. JP2018-195892

(51) Int. Cl.
*F16D 3/66* (2006.01)
*B62M 21/00* (2006.01)
(Continued)

(52) U.S. Cl.
CPC ............... *F16D 3/66* (2013.01); *B62M 21/00* (2013.01); *F16F 15/133* (2013.01); *F16F 15/162* (2013.01)

(58) Field of Classification Search
CPC ......... F16D 3/66; B62M 21/00; F16F 15/162; F16F 15/133
(Continued)

(56) References Cited

U.S. PATENT DOCUMENTS

| 1,840,277 | A | * | 1/1932 | Rall | .......................... | F16D 3/12 |
| | | | | | | 464/160 |
| 3,321,936 | A | * | 5/1967 | Reimer | ................. | F16D 43/206 |
| | | | | | | 464/10 |
| 4,747,800 | A | | 5/1988 | Takeuchi | | |

(Continued)

FOREIGN PATENT DOCUMENTS

| CN | 104196912 B | 9/2016 |
| DE | 3742794 A1 | 6/1989 |

(Continued)

OTHER PUBLICATIONS

Office Action for German Application No. 102019120585.9 dated Jul. 2, 2021; 6 pages.

(Continued)

*Primary Examiner* — Greg Binda
(74) *Attorney, Agent, or Firm* — Lerner, David, Littenberg, Krumholz & Mentlik, LLP

(57) ABSTRACT

A damper device includes: an input shaft member to which a driving force from a crankshaft of an internal combustion engine is input, the input shaft member including a flange portion of the crankshaft; an output shaft member capable of outputting the driving force transmitted from the input shaft member; an input side cam and an output side cam respectively connected to the input shaft member and the output shaft member; rolling members pivotable on the input side cam; and an urging member urging the output side cam so as to cause it to abut the rolling members, wherein the input side cam has receiving portions recessed so as to receive the rolling members, and supply passages extending through the flange portion and the input side cam has: inlets communicated with an oil sump space; and outlets formed at the receiving portion of the input side cam.

4 Claims, 5 Drawing Sheets

(51) Int. Cl.
*F16F 15/16* (2006.01)
*F16F 15/133* (2006.01)

(58) Field of Classification Search
USPC ..................................................... 464/7, 161
See application file for complete search history.

(56) References Cited

U.S. PATENT DOCUMENTS

| | | | |
|---|---|---|---|
| 5,249,659 A | 10/1993 | Fukushima | |
| 5,855,518 A | 1/1999 | Tanaka et al. | |
| 2002/0157915 A1 | 10/2002 | Chludek | |
| 2004/0139942 A1 | 7/2004 | Kamping | |
| 2008/0283009 A1 | 11/2008 | Kohrs et al. | |
| 2009/0078526 A1 | 3/2009 | Kawatsu et al. | |
| 2009/0205920 A1 | 8/2009 | Cho et al. | |
| 2016/0369867 A1 | 12/2016 | Leonard et al. | |
| 2020/0124112 A1* | 4/2020 | Inata | B62M 21/00 |

FOREIGN PATENT DOCUMENTS

| | | |
|---|---|---|
| DE | 19628853 B4 | 1/2008 |
| FR | 2779192 A1 | 12/1999 |
| GB | 493409 A | 10/1938 |
| JP | S60091028 A | 5/1985 |
| JP | S6141021 A | 2/1986 |
| JP | H0478349 A | 3/1992 |
| JP | H04165144 A | 6/1992 |
| JP | H0594525 U | 12/1993 |
| JP | H0932864 A | 2/1997 |
| JP | 2007155057 A | 6/2007 |
| JP | 200979706 A | 4/2009 |
| JP | 2009197878 A | 9/2009 |
| JP | 2013053673 A | 3/2013 |
| JP | 5602697 B2 | 10/2014 |
| WO | 2012046273 A1 | 4/2012 |

OTHER PUBLICATIONS

First Examination Report for Indian Application No. 201914036958 dated Mar. 31, 2021; 8 pages.
French Preliminary Search Report including Written Opinion for Application No. 1911125 dated Oct. 26, 2021, 9 Pages.
Japanese Office Action for Application No. 2018-195892 dated Jun. 21, 2022, pp. 1-4.

* cited by examiner

DAMPER DEVICE

CROSS-REFERENCE TO RELATED APPLICATIONS

This application claims the benefit of the filing date of Japanese Patent Application Serial No. 2018-195892, filed on Oct. 17, 2018, the disclosure of which is hereby incorporated herein by reference.

TECHNICAL FIELD

The present invention relates to a damper device including: an input shaft member to which the rotational driving force of an internal combustion engine is input; and an output shaft member which outputs the rotational driving force transmitted from the input shaft member, the damper device capable of transmitting the rotational driving force between the input shaft member and the output shaft member.

BACKGROUND ART

To efficiently transmit the rotational driving force of an internal combustion engine, such as an engine, to the exterior thereof, a damper device is sometimes installed in the transmission path for the rotational driving force. Typically, the damper device has: an input shaft member to which the rotational driving force of an internal combustion engine is input; and an output shaft member which outputs the rotational driving force transmitted from the input shaft member, and the damper device is configured so as to be capable of efficiently transmitting the rotational driving force between the input shaft member and the output shaft member. The damper device has a mechanism for preventing: torque fluctuation of the internal combustion engine; rotational speed fluctuation thereof; vibration due to these fluctuations; and/or the like, from being transmitted between the input shaft member and the output shaft member. It is necessary to lubricate this mechanism. For the lubrication, oil is sometimes supplied from the internal combustion engine to the damper device.

Examples of the damper devices include a torque damper configured as follows. The torque damper includes: an input rotation member to which a rotational power from an internal combustion engine is input; an output rotation member arranged coaxially with the input rotation member and outputting the rotational power transmitted from the input rotation member; input side and output side damper cam members respectively provided on the input rotation member and the output rotation member so as to be incapable of relative rotation, the input side and output side damper cam members generating a relative displacement in the axial direction due to relative changes in rotational phase in a state in which they are in contact with each other; and a case accommodating the input and output rotation members and input side and output side damper cam members, and the torque damper is configured such that: an axis side oil flowing passage which extends through the input side damper cam member along the axis so as to cause the exterior of the torque damper to be communicated with a space between the input side and output side damper cam members, is provided; a gap portion in the case which is located on the input side in the axial direction with respect to the input side damper member, is filled with oil; an oil supply hole which causes the axis side oil flowing passage to be communicated with the gap portion, is provided; and an outer peripheral side oil flowing passage which extends along the axial direction in the outer periphery of the input side damper cam member so as to cause the gap portion to be communicated with the space between the input side and output side damper cam members, is provided. Furthermore, the torque damper is configured such that: oil flows into the space between the input side and output side damper cam members through only the axis side oil flowing passage, or through the axis side oil flowing passage, an oil supply hole, the gap portion, and the outer peripheral side oil flowing passage; and oil flows out from the space between the input side and output side damper cam members through only the axis side oil flowing passage, or through the axis side oil flowing passage, the oil supply hole, the gap portion, and the outer peripheral side oil flowing passage. (See, for example, patent publication JP 2013-053673 A).

SUMMARY OF THE INVENTION

Technical Problem

However, in the oil passing route of the above-described example of the damper device, the oil cannot be caused to flow efficiently within the damper device. Furthermore, the oil cannot be circulated efficiently within the damper device. Therefore, in the damper device, to cause the oil to flow efficiently and to cause the oil to circulate, it is necessary to use an oil pump to move the oil by pressure. In the case in which the oil pump is used, friction loss due to the driving of the oil pump may be increased, and as a result, fuel efficiency may deteriorate.

In view of the above circumstances, in the damper device, it is desirable that the oil can be caused to flow efficiently. Furthermore, in the damper device, it is desirable that the oil can be circulated efficiently.

Solution to the Problem

To solve the abovementioned problem, a damper device according to an aspect of the present invention includes an input shaft member, an output shaft member, a cam mechanism, and an urging member. The input shaft member (2) rotatable around a rotation axis such that a driving force from a crankshaft which is rotating within a crankcase of an internal combustion engine is input. The input shaft member includes a flange portion of the crankshaft. The output shaft member (3) rotatably supported around a rotation axis (R) via a bearing (15) in a damper case (11) adjacent to the crankcase so as to be immovable in an axial direction. The cam mechanism includes an input side cam (4) and an output side cam (5) arranged between the input shaft member (2) and the output shaft member (3) so as to respectively have opposing portions (4a, 5a) opposite each other in a direction along the rotation axis (R). The input side cam (4) is connected fixed to the input shaft member, and the output side cam (5) is supported by the output shaft member (3) so as not to be rotatable with respect to the output shaft member (3) but movable along the rotation axis (R). The input side cam (4) has a plurality of rollers (6) each of which is rotatably supported by an axis (17) extending in the radial direction and arranged equiangularly on the opposing portion (4a). The urging member (8) urges the output side cam (5) such that the opposing portion (5a) of the output side cam (5) bears on the rollers (6). The opposing portion (4a) of the input side cam (4) has an opposing surface (4b) facing the opposing portion (5a) of the output side cam (5); and a receiving portion (4c) corresponding to the outer peripheral portion (6a) of the rollers (6), the receiving portion (4c) recessed with respect to the opposing surface (4b) of the input side cam (4) so as to be capable of receiving a part of the rollers (6). The opposing portion (4a) of the input side cam (4) is provided with an oil supply passage (9) extending through the flange portion (s3) of the crankshaft (S) and the input side cam (4). The oil supply passage (9) has an inlet (9a) communicated with an oil sump space (P) surrounded by the flange portion (s3) of the crankshaft (s) and the crankcase (C) so as to be capable of gathering oil, and has an outlet (9b) formed at the receiving portion (4c) of the input side cam (4).

Advantageous Effect of the Invention

In the damper device according to an aspect, oil can be cause to flow efficiently. Furthermore, in the damper device according to an aspect, oil can be circulated efficiently.

DETAILED DESCRIPTION

A damper device according to the present Embodiment will be described together with a vehicle engine to which this damper device is mounted. The damper device according to the present invention can also be mounted to an internal combustion engine other than an engine for a vehicle, such as an automobile.

Outline of the Damper Device and the Engine

Figure 1:
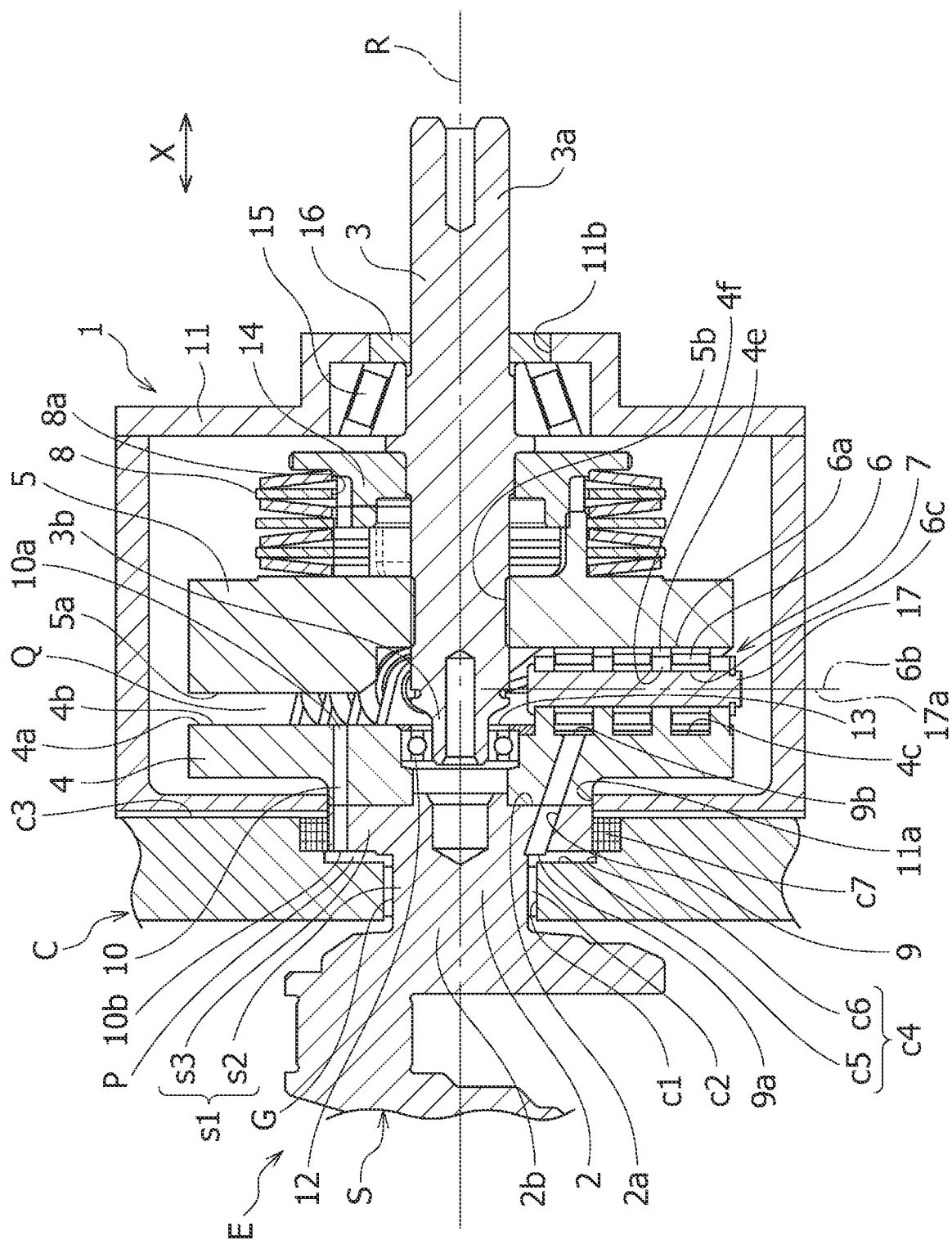
FIG. 1 is a sectional view, taken along the rotation axis, schematically showing a damper device according to the present Embodiment together with a part of a crankcase and a part of a crankshaft.

With reference to FIGS. 1 to 5, an outline of a damper device 1 according to the present Embodiment and a vehicle engine E will be described. As shown in FIG. 1, the damper device 1 is connected to a crankshaft S of the engine E.

The engine E has a crankcase C accommodating the crankshaft S. The crankshaft S is rotatable around a rotation axis R within the crankcase C. In the following, the direction along the rotation axis R will be called the rotation axis direction (indicated by arrow X). One side end portion s1 in the rotation axis direction of the crankshaft S has a journal portion s2 rotatably supported by the crankcase C. Furthermore, one side end portion s1 of the crankshaft S has a flange portion s3 located on one side in the rotation axis direction with respect to the journal portion s2. The flange portion s3 is formed so as to protrude in a rotational radial direction substantially orthogonal to the rotation axis R with respect to the journal portion s2.

Figure 2:
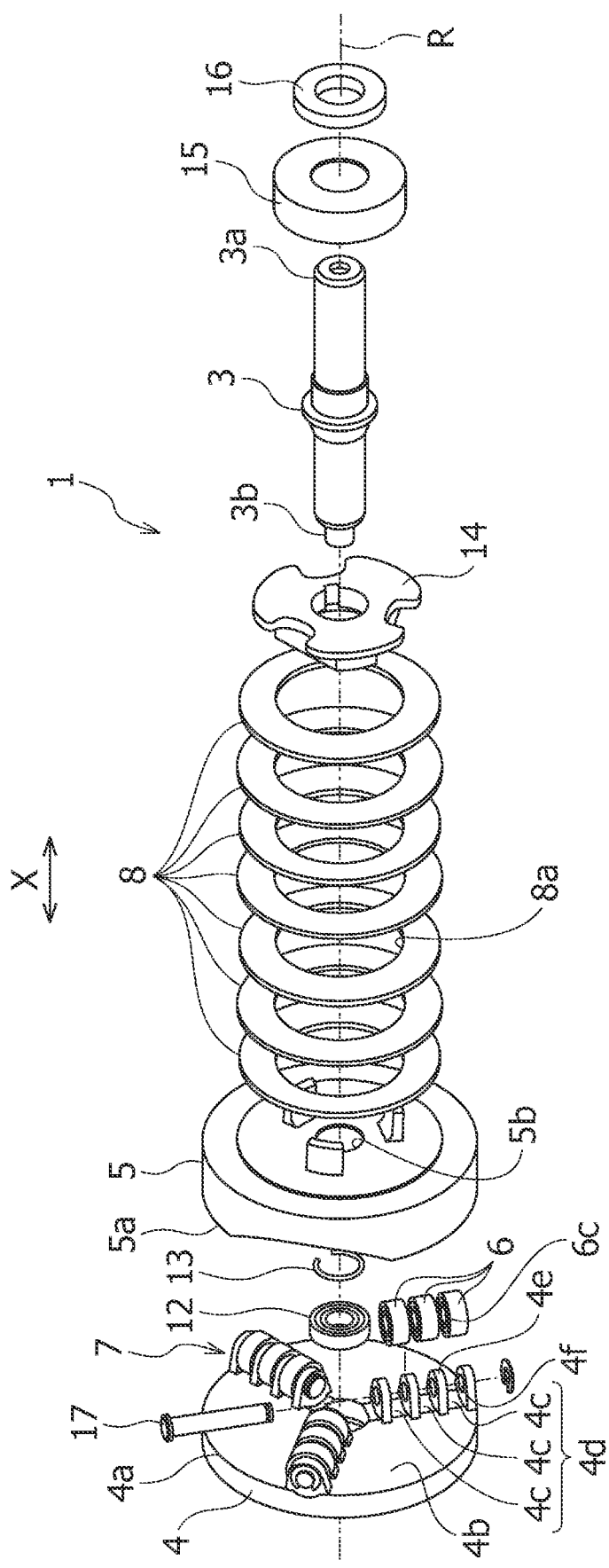
FIG. 2 is an exploded perspective view schematically showing the damper device according to the present Embodiment, while omitting an input shaft member and a damper case.

The damper device 1 has an input shaft member 2 configured so as to be rotatable around the rotation axis R such that the driving force from the crankshaft S is input to the input shaft member 2. The input shaft member 2 includes the flange portion s3 of the crankshaft S. As shown in FIGS. 1 and 2, the damper device 1 has an output shaft member 3 configured so as to be rotatable around the rotation axis R such that the driving force transmitted from the input shaft member 2 can be output from the output shaft member 3.

The damper device 1 has an input side cam 4 and an output side cam 5 respectively connected to the input shaft member 2 and the output shaft member 3. The input side cam 4 and the output side cam 5 are arranged between the input shaft member 2 and the output shaft member 3. The input side cam 4 and the output side cam 5 respectively have opposing portions 4a and 5a opposite each other in the rotation axis direction.

The damper device 1 comprises damper bearing assemblies 7 including damper bearings 6. Each damper bearing 6 has an outer peripheral portion 6a configured so as to be pivotable on the opposing portion 4a of the input side cam 4, and is a rolling member arranged between the opposing portions 4a, 5a of the input side cam 4 and the output side cam 5 in the rotation axis direction. Therefore, the damper bearing assembly 7 may also be called a rolling member assembly. However, the rolling member is not limited to this one and may be a member other than a damper bearing. For example, the rolling member may be a columnar roller configured so as to be singly rollable.

Furthermore, the damper device 1 has a Belleville spring 8 which is an urging member urging the output side cam 5 so as to cause the opposing portion 5a of the output side cam 5 to abut the outer peripheral portions 6a of the damper bearings 6. The damper bearings 6 can roll on the opposing portion 5a of the output side cam 5 in a state in which the outer peripheral portions 6a thereof are held in contact with the opposing portion 5a of the output side cam 5. The urging member, however, is not limited to this one, and may be a member other than a Belleville spring.

In this damper device 1, the opposing portion 4a of the input side cam 4 has an opposing surface 4b facing the opposing portion 5a of the output side cam 5. Furthermore, the opposing portion 4a of the input side cam 4 has receiving portions 4c which corresponds to the outer peripheral portions 6a of the damper bearings 6 and is recessed with respect to the opposing surface 4b of the input side cam 4 so as to be capable of receiving the damper bearings 6.

As shown in FIGS. 1 and 3 to 5, the damper device 1 has supply passages 9 extending through the flange portion s3 of the crankshaft S and the input side cam 4. In the damper device 1 and the engine E, there is formed an oil sump space P surrounded by the flange portion s3 of the crankshaft S and the crankcase C so that oil can be gathered. Each supply passage 9 has an inlet 9a communicated with the oil sump space P and an outlet 9b formed in a receiving portion 4c of the input side cam 4. Oil from the engine E is gathered in the oil sump space P. After this, the oil in the oil sump space P reaches the outlet 9b of the supply passage 9 from the inlet 9a of the supply passage 9 via the supply passage 9. Furthermore, it can flow to the damper bearings 6 arranged between the opposing portions 4a, 5a of the input and output side cams 4, 5.

Furthermore, the damper device 1 may be configured as follows. The damper device 1 further has discharge passages 10 extending through the flange portion s3 of the crankshaft S and the input side cam 4. Each discharge passage 10 has an inlet 10a formed in the opposing surface 4b of the input side cam 4, and an outlet 10b communicated with the oil sump space P. The oil between the opposing portions 4a, 5a of the input and output side cams 4, 5 reaches the outlets 10b of the discharge passages 10 from the inlets 10a of the discharge passages 10 via the discharge passages 10, and can further flow into the oil sump space P. Therefore, in the damper device 1, it is possible to circulate oil by means of the supply passages 9 and the discharge passages 10.

Figure 3:
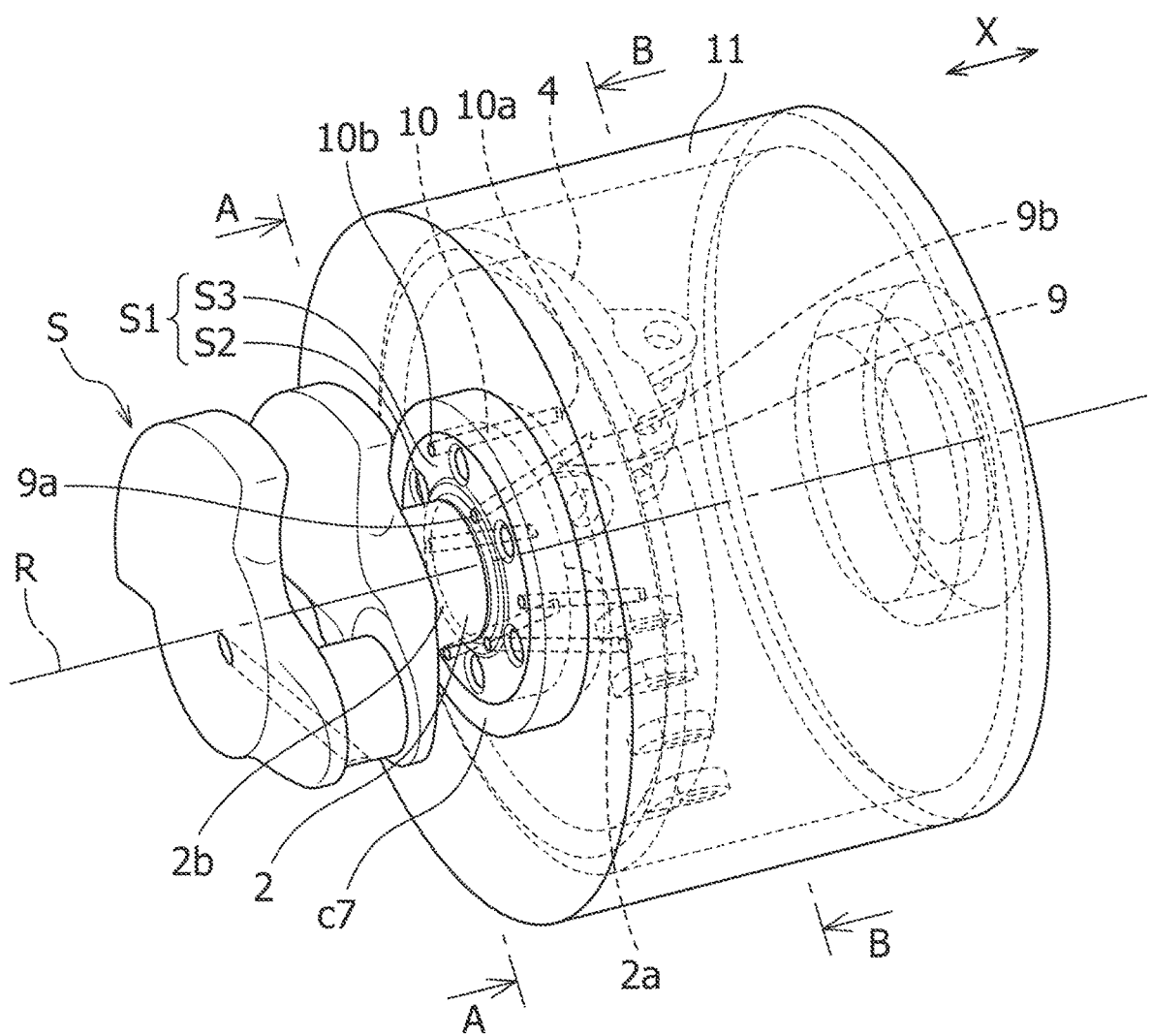
FIG. 3 is a perspective view schematically showing the input shaft member, the input side cam, and the damper case of the damper device according to the present Embodiment together with a part of the crankshaft and a crank oil seal of the crankcase.
Figure 5:
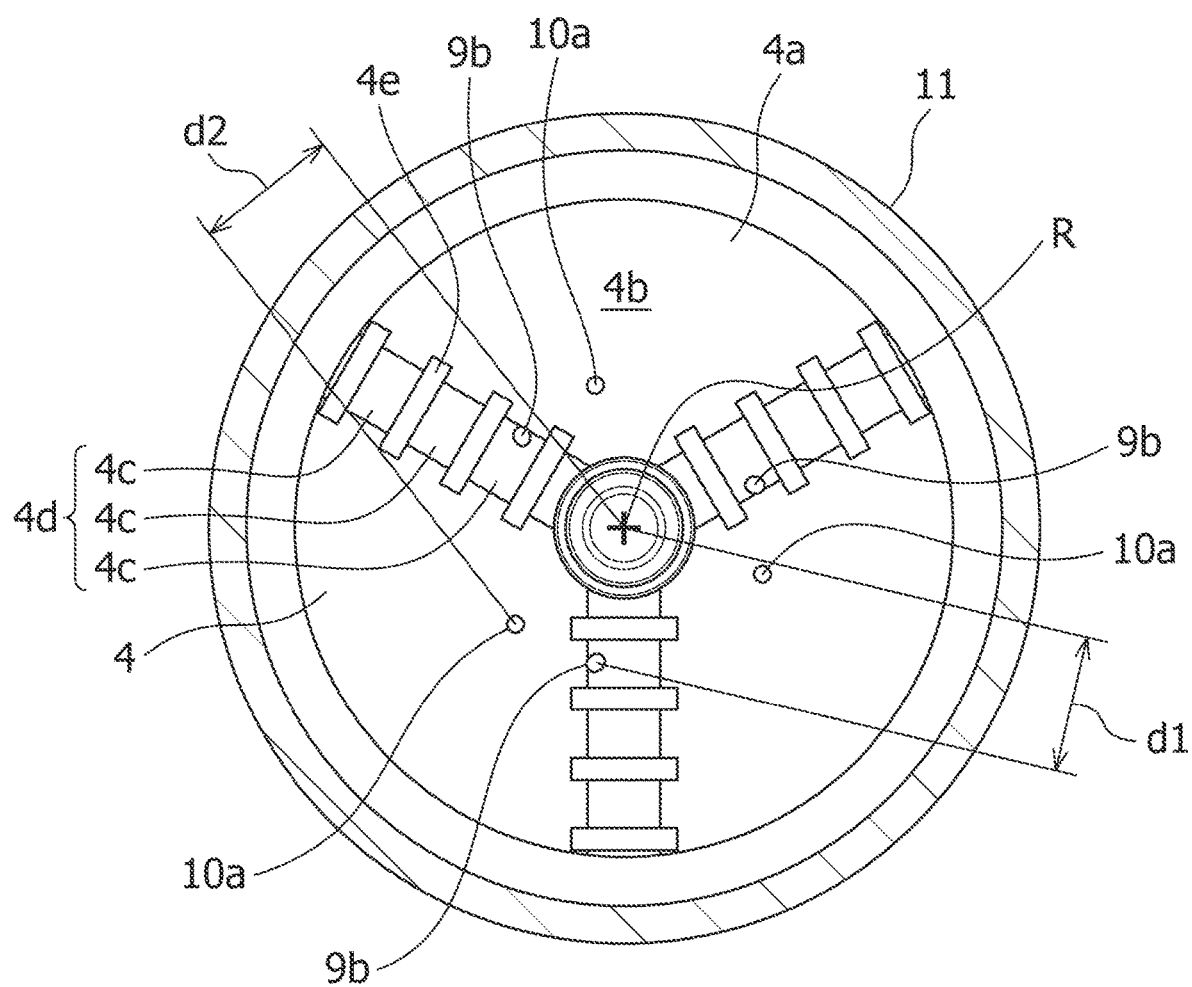
FIG. 5 is a sectional view taken along line B-B of FIG. 3.

As shown in FIG. 5, a first distance d1 between the outlet 9b of the supply passage 9 and the rotation axis R is equal to or less than a second distance d2 between the inlet 10a of the discharge passage 10 and the rotation axis R. As shown in FIGS. 1 and 3, the supply passages 9 extend along a direction inclined with respect to the rotation axis direction.

Details of the Engine

With reference to FIG. 1, the details of the engine E may be configured as follows. The crankcase C of the engine E constitutes a part of the cylinder block of the engine E. The crankcase, however, is not limited to this structure.

The crankcase C has a through-hole c1 extending along the rotation axis R. The through-hole c1 is formed so as to be in correspondence with the journal portion s2 of the crankshaft S. The crankcase C has a crank metal c2 arranged along the peripheral edge portion of the through-hole c1. The crank metal c2 rotatably supports a journal portion s2 of the crankshaft S; on the other hand, a gap G is formed between the journal portion s2 of the crankshaft S and the crank metal c2. Oil can flow through the gap G.

The crankcase C has an oil sump recess c4 recessed with respect to an outer side surface c3 thereof. The oil sump recess c4 is formed in correspondence with the flange portion s3 of the crankshaft S. The flange portion s3 is configured so as to be received by the oil sump recess c4. The oil sump recess c4 has a bottom surface c5 and a peripheral surface c6 extending from the outer peripheral edge of the bottom surface c5 toward one side in the rotation axis direction. The through-hole c1 opens in the bottom surface c5 of the oil sump recess c4.

Furthermore, the crankcase C has a crank oil seal c7 configured so as to prevent oil leakage between the flange portion s3 of the crankshaft S and the peripheral surface c6 of the oil sump recess c4 of the crank case C. The crank oil seal c7 corresponds to the flange portion s3 of the crankshaft S in the rotation axis direction, and is arranged along the peripheral surface c6 of the oil sump recess c4.

In the engine E, the oil sump space P is formed so as to be surrounded by the flange portion s3 and the oil sump recess c4. Furthermore, the oil sump space P may be formed so as to be surrounded by the flange portion s3, the bottom surface c5 and the peripheral surface c6 of the oil sump recess c4, and the crank oil seal c7.

Details of the Damper Device

With reference to FIGS. 1 and 2, the details of the damper device 1 may be given as follows. As shown in FIGS. 1 and 2, the damper device 1 has three damper bearing assemblies 7. However, the damper device has at least one damper bearing assembly, more preferably, two or more damper bearing assemblies, and most preferably, three or more damper bearing assemblies. One damper bearing assembly 7 has three damper bearings 6, and the damper device 1 has nine damper bearings 6. However, it is only necessary for one damper bearing assembly to have at least one damper bearing, and the damper device has at least one damper bearing, more preferably, two or more damper bearings, and most preferably, three or more damper bearings.

Furthermore, the damper device 1 has seven Belleville springs 8. However, it is only necessary for the damper device to have at least one Belleville spring. In the case in which the damper device 1 has a plurality of Belleville springs 8, the plurality of Belleville springs 8 may be arranged in series in the rotation axis direction.

As shown in FIG. 1, the damper device 1 has a damper case 11 formed as the casing thereof. The damper case 11 has an input shaft insertion hole 11a and an output shaft insertion hole 11b extending through the damper case 11 so as to be respectively in correspondence with the input shaft member 2 and the output shaft member 3.

The input shaft member 2 and the output shaft member 3 are respectively inserted into the input shaft insertion hole 11a and the output shaft insertion hole 11b, and, in this state, the damper case 11 can gather oil in the interior thereof. One side end portion 2a, in the rotation axis direction, of the input shaft member 2 is located inside the damper case 11, and the other side end portion 2b, in the rotation axis direction, of the input shaft member 2 is located outside the damper case 11. One side end portion 3a, in the rotation axis direction, of the output shaft member 3 is located inside the damper case 11, and the other side end portion 3b, in the rotation axis direction, of the output shaft member 3 is located outside the damper case 11.

As shown in FIGS. 1 and 2, the damper device 1 has an input side center bearing 12 arranged along the rotation axis R and mounted to the input side cam 4. The input side center bearing 12 rotatably supports the other side end portion 3b, in the rotation axis direction, of the output shaft member 3. Furthermore, the damper device 1 has a circlip (C-clip) 13 which is retaining member for retaining the input side center bearing 12 with respect to the input side cam 4. The retaining member is not limited to this, and it may be a member other than a circlip.

The damper device 1 has a Belleville spring holder 14 for retaining the Belleville spring 8 with respect to the output side cam 5 in a state in which it is elastically deformable. The Belleville spring holder 14 may also be called the urging member holder.

The damper device 1 has an output side center bearing 15 arranged along the rotation axis R and mounted to the damper case 11. The output side center bearing 15 is located at an interval at one side in the rotation axis direction with respect to the input side center bearing 12.

Furthermore, the damper device 1 has a damper oil seal 16 configured so as to prevent oil leakage between the output shaft member 3 and the output shaft insertion hole 11b of the damper case 11. The damper oil seal 16 is arranged along the peripheral edge portion of the output shaft insertion hole 11b. Furthermore, the damper oil seal 16 is located at one side in the rotation axis direction with respect to the output side center bearing 15.

In the damper device 1, the damper case 11 accommodates a part of the input shaft member 2, a part of the output shaft member 3, the input side cam 4, the output side cam 5, the damper bearing assemblies 7 each of which has the damper bearings 6, the Belleville spring 8, the input side center bearing 12, the circlip 13, the Belleville spring holder 14, and the output side center bearing 15.

Details of the Input Shaft Member and the Output Shaft Member

With reference to FIGS. 1 and 2, the details of the input shaft member 2 and the output shaft member 3 may be given as follows. As shown in FIG. 1, the input shaft member 2 is integral with the flange portion s3 of the crankshaft S. In particular, the flange portion s3 may be integral with the input shaft member 2. As shown in FIGS. 1 and 2, the output shaft member 3 extends along the rotation shaft R. The input shaft member 2 and the output shaft member 3 are arranged along the same rotation axis R, and are rotatable around the same rotation axis R. The output shaft member 3 is inserted into the through-hole 8a of the Belleville spring 8.

Details of the Input Side Cam

With reference to FIGS. 1, 2, and 5, the details of the input side cam 4 may be given as follows. As shown in FIG. 1, the input side cam 4 is arranged so as to abut the flange portion s3 of the crankshaft S in the rotation axis direction. The input side cam 4 is located on one side in the rotation axis direction with respect to the flange portion s3. The input side cam 4 is formed so as to protrude in the rotational radial direction with respect to the flange portion s3.

As shown in FIGS. 2 and 5, the input side cam 4 has nine receiving portions 4c corresponding to the nine damper bearings 6. However, the input side cam 4 can have n receiving portions 4c corresponding to the n damper bearings 6 (n is a positive integer). Each receiving portion 4c extends so as to have a substantially arcuate sectional surface. The axis of the receiving portion 4c is substantially orthogonal to the rotation axis R and is arranged along the rotational radial direction.

The input side cam 4 may have adjacent receiving portions 4c arranged at an interval along the same axis. For example, in FIG. 5, the input side cam 4 has three receiving portion assemblies 4d each of which is composed of three receiving portions 4c, and in each receiving portion assembly 4d, three receiving portions 4c are arranged at intervals along the same axis, while the input side cam 4 has adjacent receiving portions 4c arranged at intervals along the same axis.

Between the adjacent receiving portions 4c, a shaft support portion 4e which supports a bearing shaft 17 of a damper bearing assembly 7 described below, is provided. The shaft support portions 4e may be formed integral with the opposing portion 4a of the input side cam 4. However, the adjacent receiving portions may also be connected to each other in the rotational radial direction.

Details of the Output Side Cam

With reference to FIGS. 1 and 2, the details of the output side cam 5 may be given as follows. The output side cam 5 has a through-hole 5b extending through the output side cam 5 along the rotation axis R. The through-hole 5b is formed so as to be in correspondence to the output shaft member 3.

The output side cam 5 is movable in the rotation axis direction with respect to the output shaft member 3; on the other hand, it is mounted to the output shaft member 3 in a state in which it is inserted into the through-hole 5b so as to prevent its movement in the rotational peripheral direction around the rotation axis R with respect to the output side cam 5. The output side cam 5 is located on the other side in the rotation axis direction with respect to the Belleville spring 8. The output side cam 5 is urged from one side toward the other side in the rotation axis direction by the Belleville spring 8. In particular, the axial movement of the Belleville spring holder 14 is restricted from one side, so that the Belleville spring 8 urges the output side cam 5 from one side toward the other side in the rotation axis direction.

Details of Damper Bearing and Damper Bearing Assembly

With reference to FIGS. 1 and 2, the details of the damper bearing 6 and the damper bearing assembly 7 may be given as follows. The outer peripheral portion 6a of each damper bearing 6 is rotatable around the bearing axis 6b of the damper bearing 6. The bearing axis 6b is substantially orthogonal to the rotation axis R, and is arranged along the rotational radial direction. Each damper bearing 6 is received by the receiving portion 4c of the input side cam 4 corresponding thereto. Furthermore, the damper bearings 6 are rotatably mounted to the input side cam 4.

The damper bearing assembly 7 has the bearing shaft 17 rotatably supporting the damper bearings 6. In one damper bearing assembly 7, the damper bearings 6 are arranged such that the bearing axis 6b thereof substantially coincides with a bearing shaft axis 17a extending along the longitudinal direction of the bearing shaft 17. The bearing shaft 17 is mounted to the input side cam 4 in a state in which it is inserted into through-holes 6c of the damper bearings 6 and into through-holes 4f of the shaft support portions 4e of the input side cam 4.

Details of Supply Passage

Figure 4:
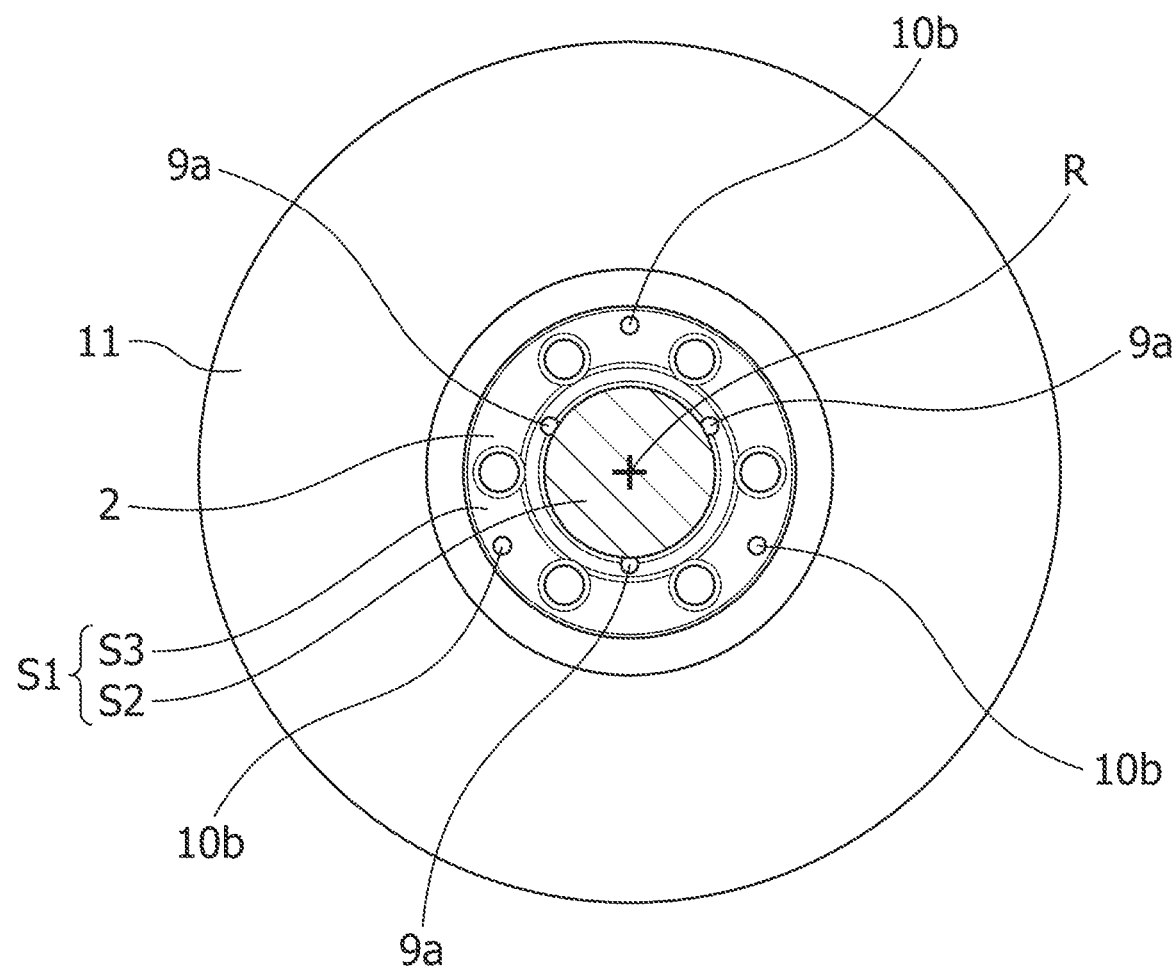
FIG. 4 is a sectional view taken along line A-A of FIG. 3.

With reference to FIGS. 1 and 3 to 5, the details of the supply passage 9 may be formed as follows. As shown in FIGS. 3 to 5, the damper device 1 has three supply passages 9. However, the damper device may be formed so as to have at least one supply passage. In the case in which the damper device 1 has a plurality of supply passages 9, the plurality of supply passages 9 are arranged at intervals in the rotational peripheral direction around the rotation axis R. In particular, the plurality of supply passages 9 may be arranged substantially at equal intervals in the rotational peripheral direction.

As shown in FIGS. 1 and 3 to 5, each supply passage 9 is formed so as to extend through the flange portion s3 of the crankshaft S and the input side cam 4. The supply passages 9 are formed so as to extend substantially linearly. The inlets 9a of the supply passages 9 are arranged closer to the rotation axis R than the outlets 9b of the supply passages 9.

Details of Discharge Passage

With reference to FIGS. 1 and 3 to 5, the details of the discharge passage 10 may be given as follows. As shown in FIGS. 3 to 5, the damper device 1 has three discharge passages 10. However, the damper device may be formed so as to have at least one discharge passage. In the case in which the damper device 1 has a plurality of discharge passages 10, the plurality of discharge passages 10 are arranged at intervals in the rotational peripheral direction, and, in particular, the plurality of discharge passages 10 may be arranged substantially at equal intervals in the rotational peripheral direction.

As shown in FIG. 1 and FIGS. 3 to 5, each discharge passage 10 is formed so as to extend through the flange portion s3 of the crankshaft S and the input side cam 4. The discharge passage 10 is formed so as to extend substantially linearly. The discharge passage 10 extends along the rotation axis direction. However, the discharge passage can also be formed so as to extend in a direction inclined with respect to the rotation axis direction.

Oil Flow in Damper Device

The oil flow in the damper device 1 of the present Embodiment will be described. First, there exists in the crankcase C of the engine E oil for lubricating the crankshaft S, etc. In the state in which the crankshaft S rotates, the oil in the crankcase C flows into the oil sump space P through the gap G between the journal portion s2 and the crank metal c2 of the crankshaft S.

The oil is sent to the inlets 9a of the supply passages 9 by the pressure when it flows into the oil sump space P via the gap G. After this, the oil is sent to the receiving portions 4c of the input side cam 4 from the supply passages 9 via the outlets 9b of the supply passages 9 by the inertial force when it is sent to the inlets 9a of the supply passages 9 from the oil sump space P and by the centrifugal force attributable to the rotation of the flange portion s3 of the crankshaft S and of the input side cam 4. The oil sent to the receiving portions 4c of the input side cam 4 lubricates the damper bearings 6.

Furthermore, the oil is sent to an intermediate space Q between the opposing portions 4a and 5a of the input side cam 4 and the output side cam 5. In the intermediate space Q, the oil is moved away from the rotation axis R by the centrifugal force attributable to the rotation of the input side cam 4 and the output side cam 5. The oil therefore moved is sent to the inlets 10a of the discharge passages 10. At this time, the oil that has not been sent to the inlets 10a of the discharge passages 10 can be sent to the inlets 10a of the discharge passages 10 after circulating through the intermediate space Q or the damper case 11. After this, the oil sent to the inlets 10a of the discharge passages 10 is sent again to the oil sump space P from the discharge passages 10 via the outlets 10b of the discharge passages 10. Thanks to this flow, the oil can lubricate the interior of the damper device 1.

As described above, in the damper device 1 according to the present Embodiment, the oil flowing out of the journal portion s2 of the crankshaft S can be caused to flow to the damper bearings 6 arranged between the input side cam 4 and the output side cam 5 through the supply passages 9 extending through the flange portion s3 of the crankshaft S and the input side cam 4 from the oil sump space P surrounded by the flange portion s3 of the crankshaft S and the crankcase C. In the damper device 1, the oil can be efficiently sent to the supply passages 9 by the pressure when it flows out of the journal portion s2 of the crankshaft S. Furthermore, the oil can be efficiently supplied from the supply passages 9 to the damper bearings 6 by the inertial force when it is sent to the supply passages 9 and by the centrifugal force attributable to the rotation of the flange portion s3 of the crankshaft S and of the input side cam 4. Since the outlets 9b of the supply passages 9 are formed at the receiving portions 4c of the input side cam 4 receiving the damper bearings 6, it is possible to supply the oil efficiently to the damper bearings 6. Therefore, in the damper device 1, the oil can be caused to flow efficiently.

In the damper device 1 according to the present Embodiment, the oil in the intermediate space Q between the opposing portions 4a and 5a of the input side cam 4 and the output side cam 5 can be caused to flow into the oil sump space P via the discharge passages 10 extending, separately from the supply passages 9, through the flange portion s3 of the crankshaft S and the input side cam 4. In the damper device 1, it is possible to cause the oil to flow efficiently and the oil to circulate efficiently between the oil sump space P and the intermediate space Q by using the supply passages 9 and the discharge passages 10. Therefore, in the damper device 1, it is possible to cause the oil to flow efficiently and the oil to circulate efficiently.

In the damper device 1 according to the present Embodiment, the oil in the intermediate space Q is urged to move away from the rotation axis R by the centrifugal force attributable to the rotation of the input side cam 4 and the output side cam 5. In view of this, the first distance d1 between the outlet 9b of the supply passage 9 and the rotation axis R is not more than the second distance d2 between the inlet 10a of the discharge passage 10 and the rotation axis R. Therefore, after the oil supplied from the outlets 9b of the supply passages 9 has reached the intermediate space Q, it is possible to urge the oil in the intermediate space Q to move toward the inlets 10a of the discharge passages 10. Therefore, in the damper device 1, it is possible to cause the oil to flow efficiently, and to circulate the oil efficiently.

In the damper device 1 according to the present Embodiment, it is possible to attain the same effect as that of a screw pump because of the centrifugal force attributable to the rotation of the input side cam 4 and the supply passages 9 inclined with respect to the rotation axis direction. Thanks to this effect, it is possible to efficiently supply oil from the oil sump space P to the damper bearings 6 via the supply passages 9.

The present invention is not limited to the Embodiment described above but allows modification and alteration based on the technical idea thereof.

REFERENCE SIGNS LIST

1 . . . Damper device, 2 . . . Input shaft member, 3 . . . Output shaft member, 4 . . . Input side cam, 4a . . . Opposing portion, 4b . . . Opposing surface, 4c . . . Receiving portion, 5 . . . Output side cam, 5a . . . Opposing portion, 6 . . . Damper bearing (rolling member), 6a . . . Outer peripheral portion, 8 . . . Belleville spring (urging member), 9 . . . Supply passage, 9a . . . Inlet, 9b . . . Outlet, 10 . . . Discharge passage, 10a . . . Inlet, 10b . . . Outlet, E . . . Engine (Internal combustion engine), R . . . Rotation axis, S . . . Crankshaft, s3 . . . Flange portion, C . . . Crankcase, P . . . Oil sump space, d1 . . . First distance, d2 . . . Second distance

The invention claimed is:

1. A damper device comprising:
an input shaft member rotatable around a rotation axis such that a driving force from a crankshaft which is rotating, within a crankcase of an internal combustion engine, is input to the input shaft member, the input shaft member including a flange portion of the crankshaft;
an output shaft member rotatably supported around the rotation axis via a bearing in a damper case adjacent to the crankcase so as to be immovable in an axial direction;
a cam mechanism including an input side cam and an output side cam arranged between the input shaft member and the output shaft member so as to respectively have opposing portions opposite each other in a direction along the rotation axis, the input side cam connected to the input shaft member, and the output side cam supported by the output shaft member so as not to be rotatable with respect to the output shaft member but be movable along the rotation axis, the input side cam having a plurality of rollers each of which is rotatably supported by an axis extending in the radial direction and arranged equiangularly on the opposing portion; and
an urging member urging the output side cam such that the opposing portion of the output side cam bears on the rollers,
wherein the opposing portion of the input side cam has an opposing surface facing the opposing portion of the output side cam; and a plurality of receiving portions corresponding to the respective outer peripheral portion of the rollers, each of the receiving portions recessed with respect to the opposing surface of the input side cam so as to be capable of receiving a part of the respective rollers,
an oil supply passage extending through the flange portion of the crankshaft and the input side cam, is provided, and
the oil supply passage has: an inlet communicated with an oil sump space surrounded by the flange portion of the crankshaft and the crankcase so as to be capable of gathering oil; and an outlet formed at the receiving portion of the input side cam.

2. The damper device according to claim 1, wherein an oil discharge passage extending through the flange portion of the crankshaft and the input side cam, is provided, and the oil discharge passage has: an inlet formed in the opposing surface of the input side cam; and an outlet communicated with the oil sump space.

3. The damper device according to claim 2, wherein a first distance between the outlet of the oil supply passage and the rotation axis is equal to or less than a second distance between the inlet of the discharge passage and the rotation axis.

4. The damper device according to claim 1, wherein the oil supply passage extends in a direction inclined with respect to the rotation axis direction.

* * * * *